US011993105B2

(12) United States Patent
Hoshiba et al.

(10) Patent No.: US 11,993,105 B2
(45) Date of Patent: May 28, 2024

(54) PNEUMATIC TIRE AND METHOD FOR MANUFACTURING THE SAME

(71) Applicant: The Yokohama Rubber Co., LTD., Tokyo (JP)

(72) Inventors: Takashi Hoshiba, Hiratsuka (JP); Masahiro Naruse, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 199 days.

(21) Appl. No.: 16/754,112

(22) PCT Filed: Sep. 27, 2018

(86) PCT No.: PCT/JP2018/035946
§ 371 (c)(1),
(2) Date: Apr. 6, 2020

(87) PCT Pub. No.: WO2019/069791
PCT Pub. Date: Apr. 11, 2019

(65) Prior Publication Data
US 2020/0282679 A1  Sep. 10, 2020

(30) Foreign Application Priority Data
Oct. 6, 2017  (JP) .................. 2017-195834

(51) Int. Cl.
*B60C 19/12* (2006.01)
*B60C 19/00* (2006.01)
*B29D 30/06* (2006.01)

(52) U.S. Cl.
CPC .......... *B60C 19/12* (2013.01); *B29D 30/0654* (2013.01); *B29D 30/0685* (2013.01);
(Continued)

(58) Field of Classification Search
CPC ....... B60C 19/00; B60C 19/002; B60C 19/12; B60C 19/125; B60C 11/24; B60C 13/02; B60C 2013/026
(Continued)

(56) References Cited

U.S. PATENT DOCUMENTS 7,086,438 B1 *  8/2006  Vossberg ............. B60C 17/047
                                                    152/454
2012/0000588 A1 *  1/2012  Tanno .................. B60C 19/002
                                                    152/450
(Continued)

FOREIGN PATENT DOCUMENTS

DE    102015224294 A1 *  6/2017  ............ B60C 11/04
JP    2005014809 A *  1/2005
(Continued)

OTHER PUBLICATIONS

Kenji Hashimoto, JP-2015020731-A, updated machine translation. (Year: 2015).*
(Continued)

*Primary Examiner* — Sedef E Paquette
(74) *Attorney, Agent, or Firm* — Thorpe North & Western (57) ABSTRACT

Provided is a pneumatic tire including an indicator made of a protrusion portion or a recess portion extending in a tire circumferential direction is formed on a tire inner surface. A sound absorbing member or a sealant layer is applied to the tire inner surface along the indicator.

18 Claims, 6 Drawing Sheets

(52) U.S. Cl.
CPC .... *B60C 19/002* (2013.01); *B29D 2030/0655* (2013.01); *B60C 19/122* (2013.01)

(58) Field of Classification Search
USPC ........................................ 152/450, 502, 504
See application file for complete search history.

(56) References Cited

U.S. PATENT DOCUMENTS

| | | | |
|---|---|---|---|
| 2012/0024439 A1* | 2/2012 | Tanno | B60C 23/0493 |
| | | | 152/154.1 |
| 2016/0207362 A1* | 7/2016 | Leffler | B29D 30/06 |
| 2016/0303923 A1 | 10/2016 | Tanno et al. | |
| 2017/0240005 A1* | 8/2017 | Kon | B29C 73/16 |
| 2017/0253091 A1 | 9/2017 | Kon et al. | |
| 2018/0236824 A1* | 8/2018 | Kayashima | B60C 19/12 |
| 2018/0290505 A1* | 10/2018 | Schürmann | B60C 13/02 |
| 2019/0061440 A1 | 2/2019 | Imai | |

FOREIGN PATENT DOCUMENTS

| | | | | |
|---|---|---|---|---|
| JP | 2012025319 A | * | 2/2012 | ......... B29D 30/0061 |
| JP | 2013010324 A | * | 1/2013 | |
| JP | 2014-084007 | | 5/2014 | |
| JP | 2015-020731 | | 2/2015 | |
| JP | 2015-128893 | | 7/2015 | |
| JP | 2015-209180 | | 11/2015 | |
| JP | 2016-060257 | | 4/2016 | |
| JP | 2017-154543 | | 9/2017 | |
| WO | WO 2014/064896 | | 5/2014 | |
| WO | WO 2015/083727 | | 6/2015 | |
| WO | WO 2016039120 | | 3/2016 | |
| WO | WO 2017/151491 | | 9/2017 | |

OTHER PUBLICATIONS

Kuwajima M, JP-2012025319-A, machine translation. (Year: 2012).*
Fujita A, JP-2013010324-A, machine translation. . (Year: 2013).*
Fukutomi T, JP-2005014809-A, machine translation. (Year: 2005).*
International Search Report for International Application No. PCT/JP2018/035946 dated Jan. 8, 2019, 4 pages, Japan.

* cited by examiner

PNEUMATIC TIRE AND METHOD FOR MANUFACTURING THE SAME

TECHNICAL FIELD

The present technology relates to a pneumatic tire and a method for manufacturing the same and particularly relates to a pneumatic tire and a method for manufacturing the same that can provide improved productivity when applying a sound absorbing member or a sealant layer to a tire inner surface.

BACKGROUND ART

In general, the outer surface of a bladder, which is used when vulcanizing a green tire, is formed with a plurality of exhaust grooves (recesses) extending in the radial direction. These grooves are provided to evacuate air between the tire inner surface and the bladder to the outside (see, for example, Japan Unexamined Patent Publication No. 2014-84007). As a result, a plurality of protrusions that correspond to the recesses in the outer surface of the bladder are formed on the inner surface of a vulcanized pneumatic tire.

Since the tire inner surface does not include any marks to indicate the appropriate position at which to apply a sound absorbing member or a sealant layer, applying the sound absorbing member or the sealant layer to the inner surface of such a vulcanized pneumatic tire requires much time and effort, thereby lowering productivity.

SUMMARY

The present technology provides a pneumatic tire and a method for manufacturing the same that can provide improved productivity when applying a sound absorbing member or a sealant layer to a tire inner surface.

A pneumatic tire according to an embodiment of the present technology includes an indicator made of a protrusion portion or a recess portion extending in a circumferential direction on a tire surface and a sound absorbing member or a sealant layer applied to the tire inner surface along the indicator.

A method for manufacturing a pneumatic tire according to an embodiment of the present technology includes the steps of: vulcanizing a green tire using a bladder having a bladder outer surface formed with a recess portion or a protrusion portion extending in a bladder circumferential direction; forming an indicator made of a protrusion portion or a recess portion extending in a tire circumferential direction on an inner surface of the vulcanized pneumatic tire; and applying a sound absorbing member or a sealant layer to the inner surface of the pneumatic tire along the indicator.

In the present technology, a tire inner surface is formed with an indicator made of a protrusion portion or a recess portion extending in a tire circumferential direction, and a sound absorbing member or a sealant layer is applied to a tire inner surface along the indicator. Thus, the sound absorbing member or the sealant layer can be accurately and efficiently applied. With this configuration, in a pneumatic tire in which a sound absorbing member or a sealant layer is applied to the tire inner surface, productivity can be improved.

In the present technology, an angle of the indicator with respect to the tire circumferential direction is preferably from 0° to 10°. With this configuration, the indicator is continuously formed on the tire inner surface in the tire circumferential direction.

In the present technology, the protrusion portion or the recess portion constituting the indicator preferably has a height or depth of from 0.3 mm to 2.0 mm and a width of from 0.5 mm to 5.0 mm. With this configuration, the dimensions of the protrusion portion or the recess portion constituting the indicator can be appropriately set to prevent air permeability of an inner liner layer from deteriorating.

In the present technology, preferably at least one section of the indicator in the tire circumferential direction includes a missing portion. With this configuration, for example, the missing portion can be used as a start position for applying the sound absorbing member, and the sound absorbing member or the sealant layer can be applied even more efficiently.

In the present technology, preferably at least two of the indicators are formed on the inner surface of the pneumatic tire. With this configuration, the same bladder can be used to apply sound absorbing members or sealant layers in a plurality of sizes.

In the present technology, the indicator is preferably expressed as a marking for identification made of a letter, a number, a symbol or a graphic. As a result, in a configuration where a plurality of the indicators are formed on the tire inner surface, for example, the sound absorbing member or the sealant layer can be accurately applied.

BRIEF DESCRIPTION OF DRAWINGS

FIGS. 2A and 2B are enlarged views of the X portion in FIG. 1 and cross-sectional views taken along a plane orthogonal to the extension direction of an indicator, where FIG. 2A illustrates a case where the indicator is a protrusion portion and FIG. 2B illustrates a case where the indicator is a recess portion.

FIG. 5A illustrates the recess portion and FIG. 5B illustrates the protrusion portion.

DETAILED DESCRIPTION

Figure 1:
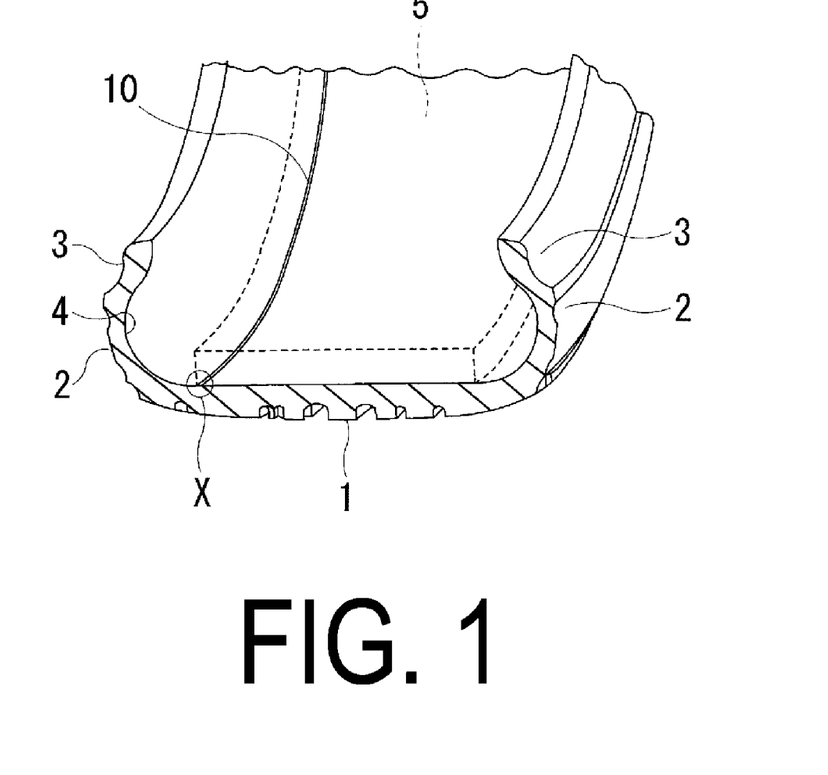
FIG. 1 is a perspective cross-sectional view of a pneumatic tire according to an embodiment of the present technology.

Configurations of embodiments of the present technology will be described in detail below with reference to the accompanying drawings. FIG. 1 illustrates a pneumatic tire according to an embodiment of the present technology. In FIG. 1, the pneumatic tire according to the present embodiment includes an annular tread portion 1 extending in the tire circumferential direction, a pair of sidewall portions 2 disposed on either side of the tread portion 1, and a pair of bead portions 3 disposed inward of the sidewall portions 2 in the tire radial direction. An inner liner layer (not shown) is disposed on a tire inner surface 4.

In the pneumatic tire described above, a sound absorbing member 5 is applied to a region of the tire inner surface 4 corresponding to the tread portion 1 along the tire circumferential direction. The sound absorbing member 5 can be bonded to the tire inner surface 4 using an adhesive or double-sided adhesive tape. The sound absorbing member 5 is made of a porous material with open cells and has predetermined noise absorbing properties based on the porous structure. Polyurethane foam is preferably used as the porous material of the sound absorbing member 5.

Figure 2A:
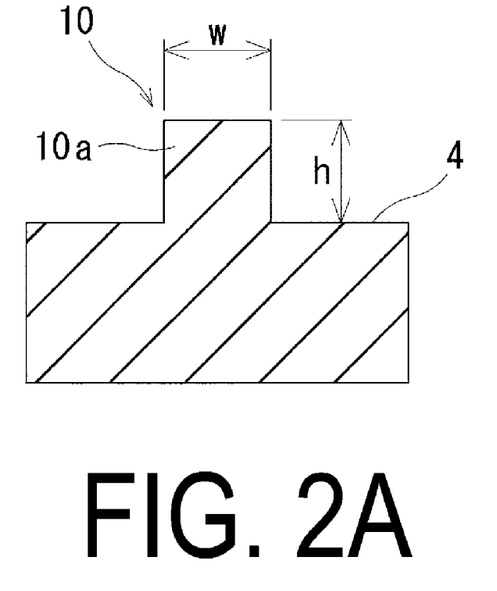
Figure 2B:
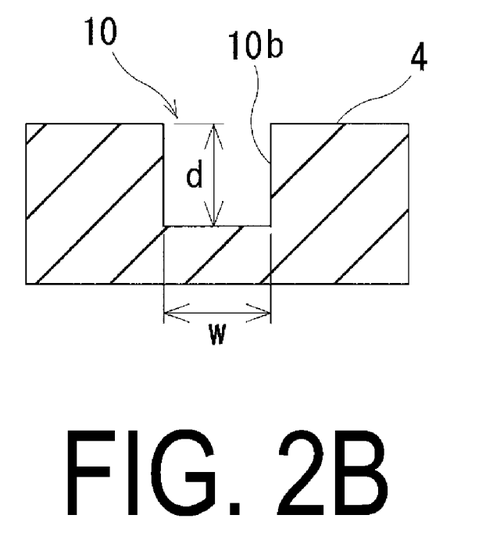

As illustrated in FIGS. 1, 2A and 2B, an indicator 10 made of a protrusion portion 10*a* or a recess portion 10*b* extending in the tire circumferential direction is formed on the tire inner surface 4. The indicator 10 is a mark for indicating the appropriate position at which to apply the sound absorbing member 5. As illustrated in FIG. 2A, the protrusion portion 10*a* constituting the indicator 10 protrudes inward in the tire radial direction, and as illustrated in FIG. 2B, the recess portion 10*b* constituting the indicator 10 is recessed outward in the tire radial direction. The protrusion portion 10*a* or the recess portion 10*b* is formed by pressing the tire inner surface 4 with a bladder B (described later). The sound absorbing member 5 is applied along the protrusion portion 10*a* or the recess portion 10*b* formed in this manner.

In the pneumatic tire described above, the indicator 10 made of the protrusion portion 10*a* or the recess portion 10*b* extending in the tire circumferential direction is formed on the tire inner surface 4, and the sound absorbing member 5 is applied to the tire inner surface 4 along the indicator 10. Thus, the sound absorbing member 5 can be applied accurately and efficiently. As a result, in a pneumatic tire in which the sound absorbing member 5 is applied to the tire inner surface 4, productivity can be improved.

In the pneumatic tire described above, the angle of the indicator 10 with respect to the tire circumferential direction is preferably from 0° to 10°. By appropriately setting the angle of the indicator 10 with respect to the tire circumferential direction within the range described above, the indicator 10 is continuously formed in the tire circumferential direction on the tire inner surface 4. Hence, the indicator 10 does not stop at a midway position on the tire circumference. Note that in the embodiment illustrated in FIG. 1, the angle of the indicator 10 with respect to the tire circumferential direction is 0°.

In the protrusion portion 10*a* or the recess portion 10*b* constituting the indicator 10, a height h of the protrusion portion 10*a* or a depth d of the recess portion 10*b* is preferably from 0.3 mm to 2.0 mm, and a width w of the protrusion portion 10*a* or the recess portion 10*b* is preferably from 0.5 mm to 5.0 mm. By appropriately setting the dimensions of the protrusion portion 10*a* or the recess portion 10*b* constituting the indicator 10 within the ranges described above, it is possible to prevent deterioration in the air permeability of the inner liner layer disposed on the tire inner surface 4. In a configuration where the recess portion 10*b* is formed, if the depth d of the recess portion 10*b* exceeds 2.0 mm, the thickness of the inner liner layer cannot be sufficiently ensured, and it becomes more difficult to prevent the air permeability of the inner liner layer from deteriorating.

Figure 3:
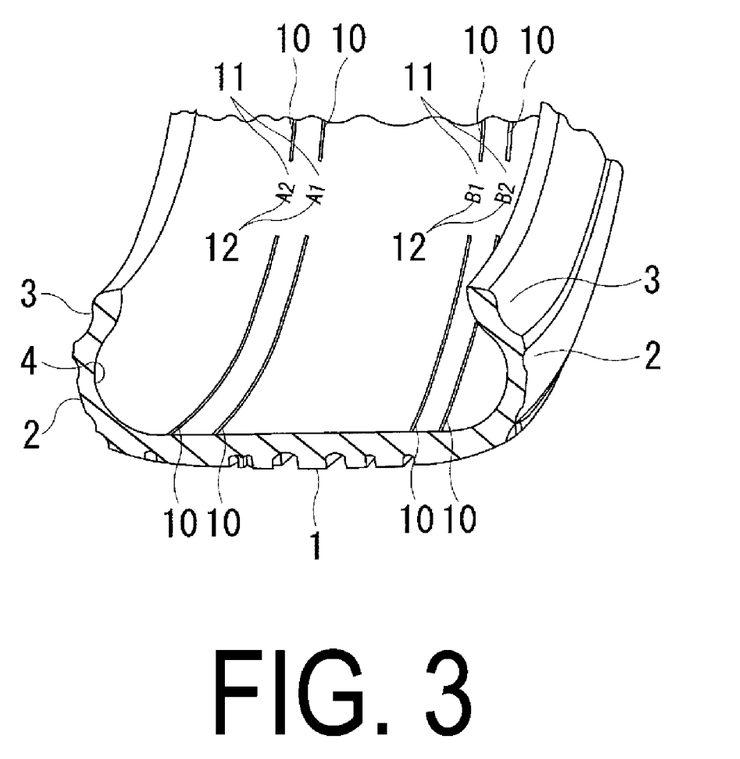
FIG. 3 is a perspective cross-sectional view of a modification example of a pneumatic tire according to an embodiment of the present technology.

FIG. 3 illustrates a modification example of a pneumatic tire according to an embodiment of the present technology. In FIG. 3, at least one section of the indicator 10 in the tire circumferential direction includes a missing portion 11. The missing portion 11 is a portion where the protrusion portion 10*a* or the recess portion 10*b* is not present on the tire circumference. By providing the missing portion 11, for example, the missing portion 11 can be used as a start position for applying the sound absorbing member 5, and thus the sound absorbing member 5 can be applied even more efficiently.

As illustrated in FIG. 3, at least two indicators 10 (four are illustrated in FIG. 3) are formed on the tire inner surface 4. By forming a plurality of the indicators 10 on the tire inner surface 4, the same bladder B can be used to apply the sound absorbing members 5 in a plurality of different sizes.

Furthermore, as illustrated in FIG. 3, the indicator 10 is expressed as a marking 12 for identification made of a letter, a number, a symbol or a graphic. The embodiment illustrated in FIG. 3 is an exemplary case where the marking 12 is one letter (letter of the alphabet) combined with one number and is located at the missing portion 11 of the indicator 10. However, in a configuration where the missing portion 11 is not included, the marking 12 for identification may be positioned adjacent to the indicator 10. By putting the marking 12 for identification onto the indicator 10, in a configuration where the tire inner surface 4 includes the plurality of indicators 10, for example, the sound absorbing member 5 can be accurately applied without confusing the indicators 10 with one another. More particularly, the marking 12 for identification is preferably formed as the recess portion 10*b* in the tire inner surface 4.

Figure 4:
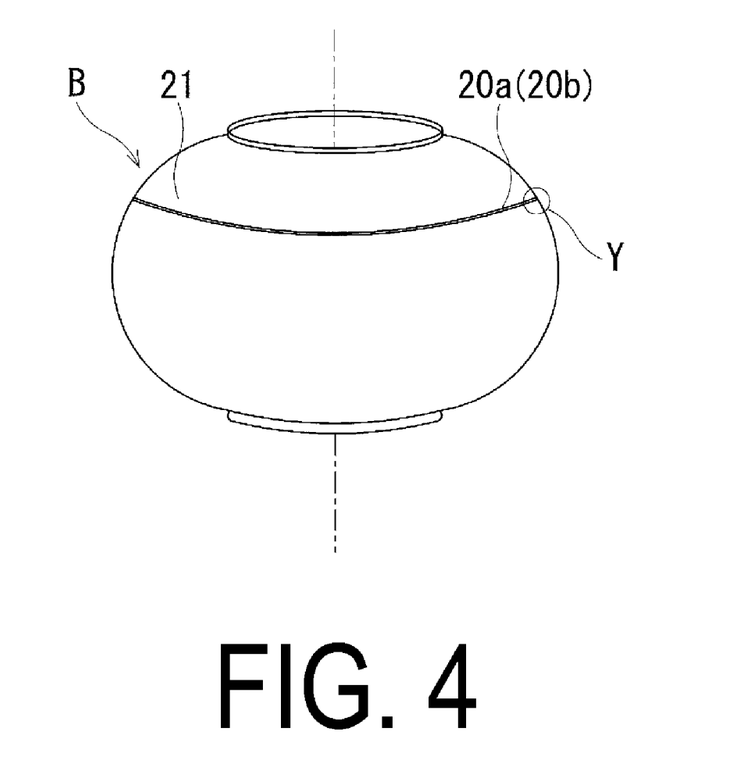
FIG. 4 is a perspective view of a bladder used in a step of vulcanization molding for the pneumatic tire in FIG. 1.
Figure 5A:
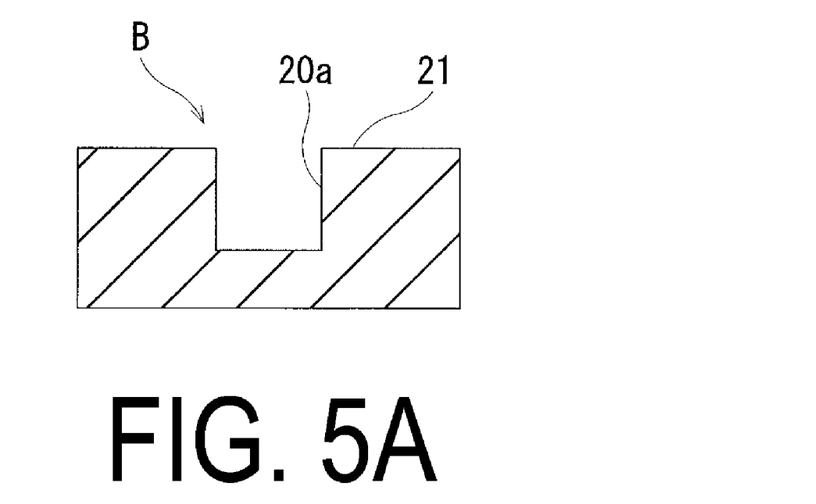
FIGS. 5A and 5B are enlarged views of the Y portion in FIG. 4 and cross-sectional views taken along a plane orthogonal to the extension direction of a recess portion or a protrusion portion formed on a bladder outer surface, where
Figure 5B:
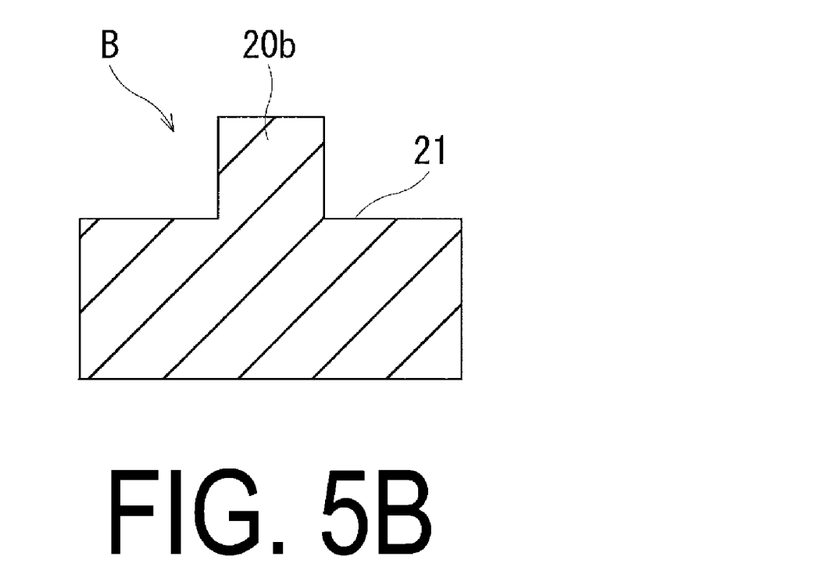

Next, a method for manufacturing a pneumatic tire according to an embodiment of the present technology will be described. As illustrated in FIGS. 4, 5A and 5B, in the method for manufacturing a pneumatic tire according to an embodiment of the present technology, a green tire is vulcanized using the bladder B having a bladder outer surface 21 formed with a recess portion 20*a* or a protrusion portion 20*b* extending in the bladder circumferential direction. In the step of vulcanization molding, the inner surface of the tire is pressed by the bladder B to form the indicator 10 made of the protrusion portion 10*a* or the recess portion 10*b* extending in the tire circumferential direction on the inner surface of the vulcanized pneumatic tire. At this time, the protrusion portion 10*a* and the recess portion 10*b* formed on the tire inner surface 4 correspond to the recess portion 20*a* and the protrusion portion 20*b* formed on the bladder outer surface 21 illustrated in FIGS. 5A and 5B, respectively. After molding the pneumatic tire in which the indicator 10 is formed on the tire inner surface 4, the sound absorbing member 5 is applied to the tire inner surface 4 along the indicator 10.

As a result, it is possible to obtain a pneumatic tire in which the sound absorbing member 5 is applied to the tire inner surface 4 along the indicator 10. According to this method for manufacturing a pneumatic tire, the sound absorbing member 5 can be applied accurately and efficiently, and therefore productivity can be improved.

In the pneumatic tire described above, the indicator 10 is the protrusion portion 10*a* or the recess portion 10*b* extending in the tire circumferential direction, but the indicator 10 is not particularly limited as such. From the perspective of increasing tire productivity, the indicator 10 is preferably the protrusion portion 10*a*. In the embodiment described above, a case in which the indicator 10 continuously extends in the tire circumferential direction at a portion excluding the missing portion 11 has been described. However, the indicator 10 may be, for example, a dashed line or dotted line that extends intermittently in the tire circumferential direction.

Figure 6:
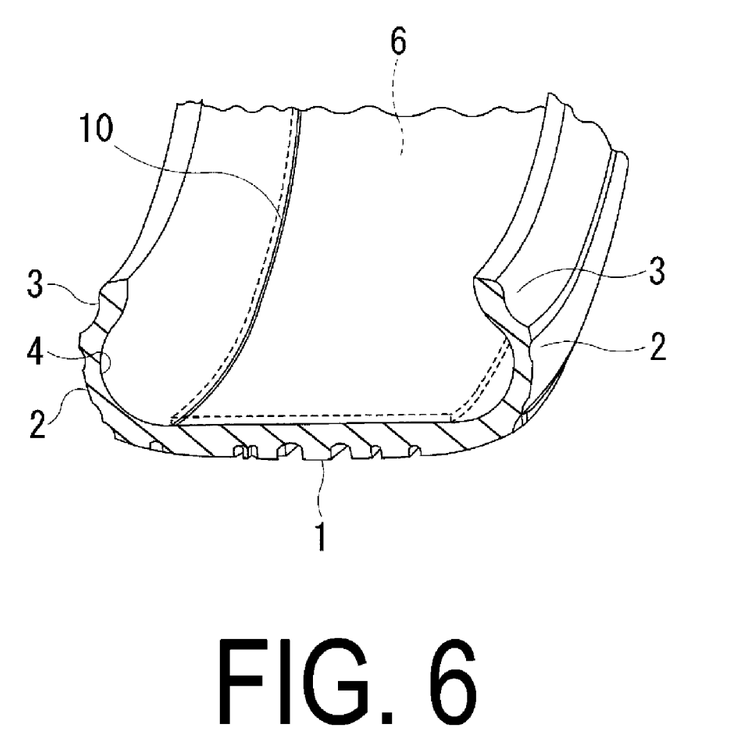
FIG. 6 is a perspective cross-sectional view of another modification example of a pneumatic tire according to an embodiment of the present technology.

In the embodiment illustrated in FIGS. 1 to 5, a case has been described where the sound absorbing member 5 is applied to the tire inner surface 4. However, the present technology can also be applied to a pneumatic tire in which a sealant layer 6 is applied to the tire inner surface 4 instead of the sound absorbing member 5. More specifically, as illustrated in FIG. 6, the sealant layer 6 is bonded in the tire circumferential direction to a region of the tire inner surface 4 corresponding to the tread portion 1. The sealant layer 6 is formed of an adhesive sealant material. Any adhesive composition can be used as the sealant material. By using such a sealant material, the sealant material can bond to the tire inner surface 4 because of the adhesive properties of the sealant material.

The invention claimed is:

1. A pneumatic tire comprising:
   an indicator made of a protrusion portion or a recess portion that extends in a tire circumferential direction on a tire inner surface, the indicator being formed from an inner liner of the pneumatic tire; and
   a sound absorbing member or a sealant layer applied to the tire inner surface with a tire width direction edge of the sound absorbing member or the sealant layer disposed along the indicator;
   wherein the indicator is a single and only indicator formed on the tire inner surface along which the sound absorbing member or the sealant layer is applied.

2. The pneumatic tire according to claim 1, wherein an angle of the indicator with respect to the tire circumferential direction is from 2° to 10°.

3. The pneumatic tire according to claim 2, wherein the protrusion portion or the recess portion constituting the indicator has a height or depth of from 0.3 mm to 2.0 mm and a width of from 0.5 mm to 5.0 mm.

4. The pneumatic tire according to claim 3, wherein at least one section of the indicator in the tire circumferential direction includes a missing portion.

5. The pneumatic tire according to claim 4, wherein the indicator is expressed as a marking for identification made of a letter, a number, a symbol or a graphic.

6. The pneumatic tire according to claim 1, wherein the protrusion portion or the recess portion constituting the indicator has a height or depth of from 0.3 mm to 2.0 mm and a width of from 0.5 mm to 5.0 mm.

7. The pneumatic tire according to claim 1, wherein at least one section of the indicator in the tire circumferential direction includes a missing portion.

8. The pneumatic tire according to claim 1, wherein the indicator is expressed as a marking for identification made of a letter, a number, a symbol or a graphic.

9. A method for manufacturing a pneumatic tire, comprising the steps of:
   vulcanizing a green tire using a bladder having a bladder outer surface formed with a recess portion or a protrusion portion extending in a bladder circumferential direction to obtain a vulcanized pneumatic tire;
   forming an indicator made of a protrusion portion or a recess portion extending in a tire circumferential direction on an inner surface of the vulcanized pneumatic tire, the indicator being formed from an inner liner of the pneumatic tire; and
   applying a sound absorbing member or a sealant layer to the inner surface of the vulcanized pneumatic tire with a tire width direction edge of the sound absorbing member or the sealant layer disposed along the indicator; wherein
   the indicator is a single and only indicator formed on the tire inner surface along which the sound absorbing member or the sealant layer is applied.

10. The method for manufacturing a pneumatic tire according to claim 9, wherein an angle of the indicator with respect to the tire circumferential direction is from 0° to 10°.

11. The method for manufacturing a pneumatic tire according to claim 10, wherein the protrusion portion or recess portion constituting the indicator has a height or depth of from 0.3 mm to 2.0 mm and a width of from 0.5 mm to 5.0 mm.

12. The method for manufacturing a pneumatic tire according to claim 11, wherein at least one section of the indicator in the tire circumferential direction includes a missing portion.

13. The method for manufacturing a pneumatic tire according to claim 12, wherein the indicator is expressed as a marking for identification made of a letter, a number, a symbol or a graphic.

14. The method for manufacturing a pneumatic tire according to claim 9, wherein the protrusion portion or recess portion constituting the indicator has a height or depth of from 0.3 mm to 2.0 mm and a width of from 0.5 mm to 5.0 mm.

15. The method for manufacturing a pneumatic tire according to claim 9, wherein at least one section of the indicator in the tire circumferential direction includes a missing portion.

16. The method for manufacturing a pneumatic tire according to claim 9, wherein the indicator is expressed as a marking for identification made of a letter, a number, a symbol or a graphic.

17. A pneumatic tire comprising:
   a tread portion, a pair of sidewall portions disposed on either side of the tread portion, and a pair of bead portions disposed inward of the sidewall portions in the tire radial direction;
   at least four indicators each made of a protrusion portion or a recess portion that extends in a tire circumferential direction on a tire inner surface of the tread portion, the at least four indicators being formed from an inner liner of the pneumatic tire; and
   a sound absorbing member or a sealant layer applied to the tire inner surface along a plurality of the at least four indicators;
   wherein the sound absorbing member or the sealant layer is a single and only sound absorbing member or sealant layer applied to the tire inner surface, and a width direction edge of the sound absorbing member or the sealant layer is disposed abutting at least one of the at least four indicators.

18. A pneumatic tire comprising:
   a tread portion, a pair of sidewall portions disposed on either side of the tread portion, and a pair of bead portions disposed inward of the sidewall portions in the tire radial direction;
   at least two indicators on a same width direction side of a sound absorbing member or a sealant layer, each of the at least two indicators being made of a protrusion portion or a recess portion that extends in a tire circumferential direction on a tire inner surface of the tread portion, the at least two indicators being formed from an inner liner of the pneumatic tire; and,
   the sound absorbing member or the sealant layer applied to the tire inner surface along at least one of the at least two indicators;
   wherein the sound absorbing member or the sealant layer is a single and only sound absorbing member or sealant layer applied to the tire inner surface, and a width direction edge of the sound absorbing member or the sealant layer is disposed abutting at least one of the at least two indicators.

\* \* \* \* \*